Patented Apr. 9, 1940

2,196,191

UNITED STATES PATENT OFFICE 2,196,191

WELDING PROCESS

Ward Holt Broadfield, Scarsdale, N. Y., assignor to Broadfield Metals Corporation, Dover, Del., a corporation of Delaware No Drawing. Application April 9, 1936, Serial No. 73,596. In Germany January 13, 1936

2 Claims. (Cl. 205—12)

The present invention relates to an improved process for welding ferrous metals and finds particular usefulness in the manufacture of metal pipe used to conduct gas, water and other materials.

In the present known processes for manufacturing pipe, ferrous plates or sheets appropriately cut are provided. The sheets or plates are heated in a furnace or oven to the required temperature and the sheet or plate is then curved or bent into the desired pipe or tube form by means of a device, such as a bell, well known in the industry. The device or bell draws the opposed edges of the sheet or plate together to the point where the same may be pressed against one another so as to become welded. After the welding operation, the pipe or tube passes between calibrating cylinders or sizing rolls to finish and size the same.

In known processes, the edges of the ferrous sheet or plate are heated to welding heat by the application of oxygen, which results in the formation of a ferrous oxide scale, which is difficult to remove. This is particularly true where pure oxygen is used since it is difficult, if not impossible, for workmen to prevent fusion of the iron and oxygen resulting in the formation of the ferrous oxide scale.

In accordance with my invention, oxygen mixed with other substances is used in such a manner as to substantially avoid the formation of such scale which is difficult to remove. It has been found that when the oxygen is diluted with other substances, the formation of such ferrous oxide scale substantially disappears.

In one form of carrying out my process, water or steam is introduced into the oxygen stream whereby the oxygen becomes diluted without impairing the ability of the oxygen to give the edges of the ferrous metal an adequate welding temperature. Any scale which is formed will thus contain a hydrogen component obtained from the water or steam, producing a hydro-oxide scale which can be easily removed by the application of a neutralizing or reducing atmosphere to be presently described.

In place of diluting the oxygen with water or steam, compressed air or nitrogen may be introduced into the jet of oxygen. Care must be taken to avoid explosion if hydrogen gas is to be introduced into the jet of oxygen. The ordinary forms of industrial oxygen, which is not pure and which contains approximately 80% or more of oxygen, may also be employed.

After the oxygen application has been completed, as hereinbefore stated, it is advantageous to subject the heated metal to a neutral atmosphere and then to a reducing gas or atmosphere, which occurs immediately after the application of the heating oxygen. The purpose of subjecting the heated metal to the reducing atmosphere is to prevent the permanent oxidation of the iron, resulting in the formation of iron oxide scale.

When the edges of the metal have been heated and treated, as above described, they are brought to a mechanical apparatus or device, such as a welding bell or rollers, and the edges are pressed together to effect a homogeneous bond or weld. At the moment of welding the metal should have a temperature most effective for satisfactory welding.

Pipe may be manufactured continuously by my process. The edges of the metal may be pressed against one another and welded at a point about fifty millimeters from the application of the oxygen heating, when the pipe moves at the rate of five meters a minute. On the other hand, the distance between the oxygen heating point and the weld point may be spaced as far apart as five meters if the pipe moves at approximately two hundred meters per minute.

It is understood that the present process may be employed in the welding of all forms of ferrous metals, provided the ends or edges of the metal to be welded are treated in accordance with the process above described.

While certain novel features of the invention have been disclosed and are pointed out in the annexed claims, it will be understood that various omissions, substitutions and changes may be made by those skilled in the art without departing from the spirit of the invention.

What is claimed is:

1. The process of manufacturing ferrous pipe by continuous process which includes, heating a ferrous strip, progressively shaping said strip into tubular form, progressively raising the edges of said strip to a welding heat by the application of approximately 80% of oxygen and of hydrogen in proportion sufficient to produce a readily reducible scale, subjecting the edges of the strip to a reducing atmosphere to remove said scale, and pressing the edges of the sheet together to form a welded bond.

2. The process of welding ferrous metals which includes, heating the parts to be welded with a mixture of oxygen and hydrogen, which mixture contains oxygen in a major proportion, and hydrogen in proportions sufficient to form an hydro-oxide scale, subjecting the heated metal to a reducing atmosphere to remove the hydro-oxide scale thus formed, and pressing the edges of the treated metal together to form a welded bond.

WARD HOLT BROADFIELD.